(12) United States Patent
Degani et al.

(10) Patent No.: US 12,398,982 B2
(45) Date of Patent: Aug. 26, 2025

(54) INCOMING THREAT PROTECTION SYSTEM AND METHOD OF USING SAME

(71) Applicant: IMI SYSTEMS LTD., Ramat Hasharon (IL)

(72) Inventors: Yinon Degani, Ramat Hasharon (IL); Arye Raybee, Ramat Hasharon (IL); Gil Sasi Segev, Ramat Hasharon (IL)

(73) Assignee: IMI SYSTEMS LTD., Ramat Hasharon (IL)

( * ) Notice: Subject to any disclaimer, the term of this patent is extended or adjusted under 35 U.S.C. 154(b) by 57 days.

(21) Appl. No.: 17/328,077

(22) Filed: May 24, 2021

(65) Prior Publication Data
US 2022/0097843 A1 Mar. 31, 2022

(30) Foreign Application Priority Data
Jul. 1, 2020 (IL) .......................................... 275792

(51) Int. Cl.
| | | |
|---|---|---|
| *F41H 11/00* | (2006.01) | |
| *B64D 7/02* | (2006.01) | |
| *B64U 10/14* | (2023.01) | |
| *B64U 101/15* | (2023.01) | |
| *G05D 1/00* | (2024.01) | |

(52) U.S. Cl.
CPC ............... *F41H 11/00* (2013.01); *B64D 7/02* (2013.01); *G05D 1/101* (2013.01); *B64U 10/14* (2023.01); *B64U 2101/15* (2023.01)

(58) Field of Classification Search
CPC ....... B64C 39/024; B64C 39/028; B64D 7/02; B64D 7/00; F41H 11/00; F41H 11/02; F41H 13/005; G05D 1/101; B64U 2101/15; B64U 2201/10; B64U 70/00; B64U 80/86
See application file for complete search history.

(56) References Cited

U.S. PATENT DOCUMENTS

| | | | |
|---|---|---|---|
| 9,862,489 B1 * | 1/2018 | Weinstein | ............... G01S 13/06 |
| 10,486,830 B2 | 11/2019 | Kahlon et al. | |
| 2006/0097102 A1 | 5/2006 | Chang | |
| 2011/0168838 A1 | 7/2011 | Hornback et al. | |
| 2012/0267472 A1 * | 10/2012 | Pratzovnick | ........... H04K 3/825 |
| | | | 244/119 |

(Continued)

FOREIGN PATENT DOCUMENTS

| | | |
|---|---|---|
| EP | 3306260 A1 | 4/2018 |
| EP | 3489138 A1 * | 5/2019 |

(Continued)

OTHER PUBLICATIONS

English Translation for EP-3489138-A1 (Year: 2019).*

(Continued)

*Primary Examiner* — Faris S Almatrahi
*Assistant Examiner* — Moises Gasca Alva
(74) *Attorney, Agent, or Firm* — Vorys, Sater, Seymour and Pease LLP; Anthony P. Venturino; Maryellen Feehery Hank

(57) ABSTRACT

The present invention relates to threat protection, in particular a system and method providing active protection using at least one UAV, e.g., drone, to neutralize an incoming aerial or ground threat or diminish or prevent damage caused, directly or indirectly, from the incoming threat.

17 Claims, 3 Drawing Sheets

(56) References Cited

U.S. PATENT DOCUMENTS

| | | | |
|---|---|---|---|
| 2016/0023760 A1* | 1/2016 | Goodrich | F41H 13/0006 244/76 R |
| 2017/0261604 A1 | 9/2017 | Van Voorst | |
| 2018/0170510 A1 | 6/2018 | Brock | |
| 2018/0341262 A1* | 11/2018 | Yeshurun | F41H 11/00 |
| 2019/0025858 A1* | 1/2019 | Bar-Nahum | G06T 7/73 |
| 2019/0068953 A1* | 2/2019 | Choi | B64C 39/024 |
| 2019/0077519 A1* | 3/2019 | Husain | B60L 53/30 |
| 2019/0107374 A1* | 4/2019 | Hill | F42B 15/01 |
| 2020/0108924 A1* | 4/2020 | Smith | F41H 13/0043 |
| 2020/0108925 A1* | 4/2020 | Smith | F41H 13/0006 |
| 2020/0108926 A1* | 4/2020 | Smith | B64C 39/024 |

FOREIGN PATENT DOCUMENTS

| | | | | |
|---|---|---|---|---|
| GB | 2380244 A | * | 4/2003 | B63G 8/28 |
| JP | 2000266499 A | | 9/2000 | |
| KR | 10-1935262 B1 | | 1/2019 | |
| RO | 132131 | | 9/2017 | |
| RO | 132161 A2 | | 9/2017 | |
| RO | 132162 A2 | * | 9/2017 | |
| WO | 2017/094000 A1 | | 6/2017 | |

OTHER PUBLICATIONS

Automotive TI mmWave sensors for mid-range radar; retrieved online at: https://www.youtube.com/watch?v=1PkcbE3zrYo; accessed Nov. 17, 2020.

This Folding "Ballistic" Quadcopter Drone Launches Out of a Cannon; retrieved online at: https://www.diyphotography.net/this-folding-ballistic-quadcopter-drone-launches-out-of-a-cannon/; accessed Nov. 17, 2020.

Dormehl, "DroneBullet is a kamikaze drone missile that knocks enemy UAVs out of the sky"; retrieved online at: https://www.digitaltrends.com/cool-tech/dronebullet-anti-drone-tech/; May 5, 2019.

Technology to Securely Capture Intruder Drones; retrieved online at: https://ustesting.com/product/fortem-dronehunter/; accessed Nov. 17, 2020.

Radar Solutions for Collision Avoidance & Vehicle Detection; retrieved online at: https://www.bannerengineering.com/my/en/products/sensors/radar-sensors.html#all; 16 pages; 2019.

Automotive Radar Basics; retrieved online at: https://www.everythingrf.com/community/automotive-radar-basics; accessed Nov. 17, 2020.

Teschler, "The basics of automotive radar"; retrieved online at: https://www.designworldonline.com/the-basics-of-automotive-radar/; 13 pages; 2019.

* cited by examiner

INCOMING THREAT PROTECTION SYSTEM AND METHOD OF USING SAME

FIELD OF THE INVENTION

The present invention relates to threat protection, in particular a system and method providing active protection using at least one UAV, e.g., drone, to neutralize an incoming aerial or ground threat or diminish or prevent damage caused, directly or indirectly, from the incoming threat (e.g. a missile, or a drone).

BACKGROUND OF THE INVENTION

Unmanned aerial vehicles (UAV), drones being a representative thereof, are widely used for both civilian and military purposes. Civilian use of drones is generally for recreational purposes, commercial use (e.g. supplying products), surveillance (e.g. aerial photography), agricultural (e.g. field fertilization), and so on. Military use of drones is generally directed to surveillance (e.g. gathering signal intelligence), reconnaissance (e.g. aerial photography), and combat/attacking. Combat drones typically carry ordnance such as missiles, and/or bombs and are used for striking targets. Additionally, combat drones may have a payload, for examples supplies for a predetermined mission. Combat drones are usually under real-time human control, with varying levels of autonomy.

Drones may have folding wings which may be useful for saving storage space, and easing their transportation, or for other purposes. Drones usually include a power supply (e.g. batteries, engine), a propulsion system, and a flight control system; and may also include a navigation system. Drones may have installed communication devices, dedicated software, for example real-time software enabling remote control for operating all or part of the systems installed in the drone. The software can control the speed and direction of the drone, launching and landing of the drone, and more. Remote control may be over all, or part of, devices/systems carried by the drone (e.g. operating a camera for surveillance, firing a missile).

Launching of drones may require a relatively short runway, depending on factors such as the drone's acceleration, aerodynamics, body weight, payload, and weather conditions. Alternatively, no runway or large open space may be required in the case of quadcopter-type drones, and drones including suitable rotors. Small and/or lightweight drones can be propelled/launched (thrown) by hand, or launched with a handheld launching device, whereas larger drones require a platform-based launcher (e.g. rail launcher). One type of launcher may be catapult launchers, which may be pneumatic, hydraulic, or other types, for elevating a drone and providing sufficient velocity and angle for takeoff. Drones can also be launched from moving vehicles, such as by positioning a drone on top of a vehicle (e.g. a truck) in a fixed cradle or launch pad, angled upwards, allowing release of the drone at a suitable velocity. Alternatively, a drone can be launched, or released from an aerial vehicle.

Missiles and projectiles may be fired from a distance and target a static object (e.g. an army post, a parked vehicle), or a mobile object (e.g. a helicopter, a moving tank). Such missiles and projectiles may be directed to their destination at the firing point (e.g. computerized firing adjuster), and/or using a self-navigation management system within the missile or projectile, and/or a remote control navigation management device (operated manually, fully autonomously, or a combination thereof).

Aerial threat alerting systems (ATAS) may detect approaching missiles, or other approaching threats, and may also enact defensive counter-measures. Different ATAS types may provide multiple alerts to multiple threats, and various ranges. One non-limiting example of an ATAS is "Trophy" (Meil Ruach), manufactured by RAFAEL, Israel. Generally, the detection is performed by electro-optical missile warning sensors, or via other technologies or a combination thereof. These sensors detect the radiant energy of the missile plume, typically in the ultra-violet and infra-red portions of the electromagnetic spectrum.

Confronting the threat of an incoming/approaching missile is a challenging task due to difficulty in determining whether a missile has been launched, and/or the short time available for recognition of the approaching missile. This situation is usually due to the remote location of the firing point of the missile, the velocity of the missile, as well as other distracting factors. Furthermore, some missiles (e.g. anti-tank missiles; surface-to-air missiles; sea to land missiles) do not necessarily require longstanding infrastructure, and/or may be fired from well disguised locations or other positions, which are difficult to locate in advance. Alternatively, missiles may be fired from an aerial vehicle.

Accordingly, defending objects of interest from projectiles and missiles generally may be categorized under two different approaches, a defensive approach, and, an offensive approach. The defensive approach may be passive, e.g. adding protective layers to potentially threatened objects, or active, e.g. frequent changing of position of the threatened object and maneuvering away from the initial position. The offensive approach is active. One type of the offensive approach is attempting to eliminate the firing device, or its operator. However, eliminating a missile firing device or its operator is typically only realistic if the missile is directed to its target at the firing point. An alternative offensive approach is targeting the approaching missile or projectile itself. The latter alternative provides the most challenging difficulties regarding timely locating the approaching missile, firing a lethal weapon against the missile, and successfully eliminating the threatening missile.

It is believed that the following publications, all of which are incorporated in their entirety as if fully embedded in the present disclosure, represent relevant technology in the field.

U.S. Pat. No. 10,486,830 (Kahlon et al.) discloses a launcher for a foldable UAV. The launcher includes a UAV launch tube and a UAV carrying case. The launcher further includes a pneumatic booster connected to the UAV for accelerating the UAV during launching. The launcher also includes a separation mechanism to permit separation of the booster from the UAV when the UAV leaves the launcher tube and to provide kinetic energy to the UAV from the pneumatic booster in the launching phase.

Korean patent KR 10-1935262 discloses a flying object and smart drone missiles for close-quarter defense to minimize damages inflicted by enemy guided missiles. The close-quarter defense flying object flies in a predetermined flying formation, and includes at least one smart drone missile that spots an enemy guided missile and calculates the timing of confrontation according to the information of the aforementioned enemy guided missile; and includes at least one clamshell that is opened and closed in order for at least one of the smart drone missiles to be dropped outside.

Romanian patent application RO 2016 00173 discloses a method of protecting armored fighting vehicles, such as tanks or armored personnel carriers, against anti-tank missiles. The method includes using, by an armored fighting vehicle such as a tank, a minimum of four flying explosive shields deposited inside a compartment in the turret of the tank. Each flying explosive shield is realized with the aid of a drone equipped with two proximity sensors and two directed charges with high-power explosive and shrapnel, able to generate, large explosive surfaces, sufficient to destroy an anti-tank missile. Each flying explosive shield is connected to the armored fighting vehicle by a strong and flexible cable, by which the drone is powered and guided with the aid of an onboard computer, and data received from tactical radar, in an optimal hovering position or an optimal fighting position with respect to the anti-tank missiles attacking the armored vehicle. The anti-tank missiles are detected they can be destroyed and deflected from the initial trajectory, regardless of whether the attack is in succession or simultaneous, or uses a high or low trajectory.

European patent application EP 3 306 260 discloses a method of defending against missile threats in the form of controllable unmanned small aircraft, while a sequence of combat measures is selected with increasing combat severity and carried out against the missile threats. The severity is based on a specified hazard level related to the defined probable threat level resulting from the missile threat for an area to be protected and based on whether an uncontrolled crash of the missile within a defense area may be accepted or not. A system designed for the defense against threat missiles in the form of controllable unmanned small vehicles is also described.

US 20180341262 (Yeshurun) discloses a system facilitating an active protecting system comprising at least one drone which is in the air in a vicinity of a protected object, and wherein the drone substantially remains in the vicinity, or at least oriented to the location of the protected objected before tracking or neutralizing of threat.

US 20170261604 (Van Voorst) discloses a tracking system to track a target drone and provide detection and tracking information of the target drone; a control system to process the detection and tracking information and provide guidance information to intercept the target drone; and a high powered intercept drone controlled by supervised autonomy, the supervised autonomy provided by processing the detection and tracking information of the target drone and sending guidance information to the intercept drone to direct the intercept drone to the target drone.

SUMMARY OF THE INVENTION

As a person of skill in the art would realize, the state of the art generally requires drones to be completely dependent on a threat alerting system (TAS), such as an aerial alerting system (ATAS), and/or an external continuous guidance providing operational tasks to the drones, and/or a control system which processes detection and tracking information before neutralizing the incoming threat. These systems and their mode of operation reduce the short time available to encounter and eliminate the threat, and increase the chances for external warning signals, and further communication with a control system to be subject to hostile electronic disruptions.

Accordingly, there is a need to provide an easily operable system for eliminating an aerial or ground threat, that is independent of any ground control unit, that maintains a capability of neutralizing a threat at any distance from its launching site, which is inexpensive and simple to operate and maintain, which is robust and which provides increased capabilities of interception with the threat.

In most general terms, the invention provides a simple to operate UAV-based system for eliminating an aerial or ground threat that is independent of any ground control unit and which maintains neutralizing capabilities at any distance from a UAV launching site. The system enables launching a UAV, e.g., a drone, from any ground position towards an aerial or ground threat, wherein the UAV is launched and is thereafter fully autonomous, as detailed herein. In other words, once launched, the UAV determines location of the incoming threat and determines the most efficient path to achieve early neutralization of the threat. Prior to launching, the UAV is in a deactivated or rest state in a launcher unit or on a ground position, which may be any ground surface or surface of a ship, a moving vehicle, etc.

In a first aspect, the invention provides a method of encountering at least one incoming aerial or ground threat, the method comprising:
  receiving by at least one UAV at least one alert signal generated by at least one threat alerting system (TAS) in response to detecting of the at least one incoming aerial or ground threat;
  in response to said at least one alert signal, launching and flying of the at least one UAV, wherein the UAV comprises at least one sensor navigation unit, and a flight control system;
  wherein the at least one sensor navigation unit directs the flight control system of the at least one UAV toward the at least one incoming threat; and
  encountering the at least one incoming aerial or ground threat by the at least one UAV.

The method may further comprise detecting at least one incoming aerial or ground threat by at least one threat alerting system (TAS). In some embodiments, the TAS subsequently sends an alert signal to the UAV.

Thus, the invention further provides a method of encountering at least one incoming aerial or ground threat, the method comprising:
  detecting at least one incoming aerial or ground threat by at least one threat alerting system (TAS);
  sending an alert signal to the UAV providing an indication of the incoming aerial or ground threat;
  upon receiving the alert signal by the UAV, launching and flying of the UAV, wherein the UAV comprises at least one sensor navigation unit, and a flight control system; wherein the at least one sensor navigation unit directs the flight control system of the at least one UAV toward the at least one incoming threat, and
  encountering the at least one incoming aerial or ground threat by the at least one UAV.

In some embodiments, a signal is generated by the TAS in response to detecting of the incoming aerial or ground threat.

Also provided is an incoming threat encountering system for encountering at least one incoming aerial or ground threat, the system comprising:
  at least one aerial or ground threat alerting system (TAS);
  at least one UAV comprising a control system and a sensor navigation unit, and
  at least one launcher for launching any one or more UAV; wherein
  the TAS is configured for detecting at least one incoming aerial or ground threat, generating and sending at least one alert signal indicative of the at least one incoming aerial or ground threat to the at least one UAV;
  the control system being configured and operable to launch the at least one UAV upon receiving the at least one alert signal from the at least one TAS; and
  the sensor navigation unit permitting self-navigation of the at least one UAV toward the at least one incoming aerial or ground threat, and encountering of the at least one UAV with the at least one incoming aerial or ground threat.

The system may be provided, wherein the at least one alert signal from the at least one TAS comprises at least one position vector data of the at least one incoming aerial or ground threat, or at least partial position vector data of the at least one incoming threat.

As a person versed in the art would appreciate, the invention concerns novel means for protection from an incoming aerial or ground threat. Thus, the system and method of the invention may be associated with and configured for protection of a particular object or environment, or may be positioned at a site independent of such an object or environment. To provide efficient and immediate response to an incoming threat, the system need not be associated with any particular object or environment. However, in some embodiments, the method and system of the invention may be adapted or configured and suitably operable to protect at least one object from an incoming aerial or ground threat. The object may be any moving or stationary objects. Such may be selected from military facilities and military vehicles, neighborhoods, municipal buildings or facilities, airports, etc. Specific examples include tanks; troop carriers; people; buildings; army bases or posts, trucks and automobiles as well as to protect aerial vehicles (e.g. helicopters, airplanes), marine vehicles (e.g. ships, boats), or off-shore drilling rigs.

Thus, according to such embodiments, a method is provided for protecting at least one object from an incoming aerial or ground threat, the method comprising:
  receiving by at least one UAV at least one alert signal generated by at least one threat alerting system (TAS) in response to detecting of the at least one incoming aerial or ground threat;
  in response to said at least one alert signal, launching and flying of the at least one UAV, wherein the UAV comprises at least one sensor navigation unit, and a flight control system; wherein the at least one sensor navigation unit directs the flight control system of the at least one UAV toward the at least one incoming threat, and
  encountering the at least one incoming aerial or ground threat by the at least one UAV to thereby protect the at least one object.

Irrespective of whether or not the purpose of a system of the invention is to protect a specific or predefined object, or to generally neutralize an incoming threat, the system is configured to receive an indication of an incoming threat and generate an alert signal to the UAV so that it may be launched to intercept the target. A threat alerting system (TAS) detects an approaching threat, such as a missile, a hostile UAV or a hostile ground vehicle, and enacts a defensive counter-measure by alerting an intercept UAV to launch in a direction of the incoming threat. Different TAS types may provide multiple alerts to multiple threats, and various ranges. A non-limiting example of an aerial threat alerting system, ATAS, is "Trophy" (Meil Ruach), manufactured by RAFAEL, Israel. Generally, the detection is performed by electro-optical missile warning sensors, or via other technologies or a combination thereof. These sensors detect the radiant energy of the missile plume, typically in the ultra-violet and infra-red portions of the electromagnetic spectrum.

In some embodiments, the TAS is ATAS, as defined.

In some specific non-limiting embodiments, the TAS comprises an activation alert signal generating and output unit that are configured to send an alert signal to a UAV in order to activate and launch the UAV (actuate the UAV to operate its propulsion system and actuate the UAV's other systems/units, for navigation, proximity detection, etc.). Accordingly, upon the TAS detecting incoming threat via the TAS's threat identification sensors, an output unit may be configured to generate and send the UAV a data alert signal comprising general direction of threat, e.g. altitude and azimuth location data of threat indicating exemplary angles $\alpha$ and $\beta$, indicating the position vector data of threat in relation to the object as detected initially by the sensors. Alternatively, the output unit may send a data alert signal to the UAV which comprises an alert of an incoming threat while the alert signal comprises only partial information of the position vector of threat (e.g. not indicating the distance of threat, and/or one, or two exemplary angles $\alpha$ and $\beta$). Alternatively, the output unit may send a data alert signal to the UAV which comprises only an alert of an incoming threat with no further data regarding the threat. Once the general, non-specific information is received by the UAV, the UAV is launched in the general direction of the threat and from that point is fully autonomous.

The "unmanned aerial vehicle, UAV", utilized in accordance with aspects of the invention may be any UAV known in the art. The UAV is however not a missile. The UAV is typically a drone. The drone may be a multi-rotor drone, a fixed wing drone, a hybrid-wing drone or any other drone known in the art.

A UAV used in accordance with the invention comprises a flight control system and a sensor navigation unit. An exemplary non-limiting flight control system may be "Vector" manufactured by UAV Navigation, Spain. However, any flight control systems of other types or sizes may be used as well. According to some embodiments, flight control systems comprise a self-adjusting and adaptation capabilities (e.g. artificial intelligence), which enable the UAV to fly; maneuver and hover in order to reach and encounter a threat. A sensor navigation unit may be an optical sensor (e.g. electro-optical), radar, a LIDAR, a combination thereof, or any other useful sensor. The LIDAR is generally a device using a method for measuring distances (ranging) by illuminating the target with laser light and measuring the reflection with a sensor. According to some embodiments, the sensor navigation unit may be part of a flight control system.

The sensor navigation unit provides a position vector of the threat to the flight control system and the UAV, upon receiving an initial direction of threat, the UAV self-navigates to encounter the threat. As used herein, the term "self-navigate" refers to the UAV's capability of being fully autonomous. In other words, the UAV has full static automation, whereby it makes all required decisions for a successful mission completion. Once the UAV is launched at a general direction of the incoming threat, or once it is provided with the initial direction of threat, the UAV maneuvers by self-control without needing pilot or operator intervention. Under certain circumstances, the sensor navigation unit may provide the UAV, while in flight, a corrected or updated position vector. However, this updated parameter does not interfere nor affect the self-navigation of the UAV. Putting it differently, the self-navigating or autonomous UAV of systems and methods of the invention are independent of any ground control or operation.

The UAV is said to be deactivated or at rest when the alert signal is received from the TAS. In other words, at the time of receiving the alert signal, the UAV is on ground waiting to be launched into action. Thus, the term "deactivated" "at rest" refers to the non-active or fly-mode of the UAV, wherein the UAV is on ground or in a launching device. The ground on which the UAV or launching device are positioned may be any stationary or moving site or location, including stationary launching sites, and sites established on ships and other moving vehicles. Launching is thus to include launching of the UAV from its launching site or launching system.

A protection system may be implemented on the UAV wherein the UAV is designed or intended to encounter a threat. The term "encounter" or any lingual variation thereof, when made with reference to the UAV, generally means to "come into contact" or to be "at a sufficiently close distance (or effective distance)" to permit neutralization of the incoming thereat. In some embodiments, the threat may be neutralized by actual collision, i.e. physical contact between any section of the UAV with the aerial or ground threat. Alternatively, the threat may be neutralized from a distance.

Accordingly, encountering of the UAV with the threat may be by collision, or by proximity collision, which may activate (e.g. detonate) a warhead of the threat, or cause an irrevocable damage to the threat, or divert the threat from reaching its destination, or diminish or minimize predefined lethal effectiveness of the threat upon reaching its destination.

For the purpose of achieving effective neutralization, the UAV may be further equipped with an encountering mechanism capable of generating shock waves for reducing or eliminating the threat. According to some embodiments, shock waves may be generated by a payload of the UAV. Thus, the UAV may be designed or configured (and operable) to explode upon contact with or in the vicinity of the threat, via an explosive payload or explosive device, which may comprise a triggering element of any type. The triggering element may be in a form of a fuse, such as a proximity fuse; a contact fuse, or a combination thereof, or in a form of a signal explosion activator, an air bag mechanism triggering explosion and/or movement of a mechanical knob, and others. A proximity sensor may be used to bring about explosion at a distance from the threat. The proximity sensor may be an optical sensor, a heat sensor, an electromagnetic sensor, a RF sensor, or any other sensor enabling determination of effective proximity to the threat.

The threat to be neutralized may be an aerial threat or a ground threat such as a missile, a hostile UAV or a drone, a military vehicle, a hostile vehicle, or any other air or ground vehicle requiring neutralization. In some embodiments, the threat is an aerial threat which may be intercepted during its travel through air.

According to another aspect of the present invention there is provided a method of protecting at least one object from at least one incoming aerial or ground threat, the method comprising generating and sending at least one alert signal of at least one incoming aerial or ground threat using at least one threat alerting system (TAS), such as ATAS; launching at least one UAV comprising at least one flight control system and at least one sensor navigation unit; wherein the at least one sensor navigation unit directs the at least one flight control system, navigating the at least one UAV toward the at least one incoming threat, and encountering of the at least one UAV with the at least one incoming aerial or ground threat.

In some embodiments of a method of protecting at least one object, the at least one alert signal from the at least one TAS comprises at least one position vector data of the at least one incoming aerial or ground threat, or at least partial position vector data of the at least one incoming threat. In the method of protecting at least one object, the at least one sensor navigation unit may be any one of an optical sensor, a radar, a LIDAR, or a combination thereof, as well as others as known in the art.

In some embodiments of the method of protecting at least one object, the method comprises, prior to launching, loading the at least one UAV into, or onto, at least one launching mechanism. In the method of protecting at least one object, at least one of the UAVs is deformed before, or at loading into or onto the at least one launching mechanism.

In some embodiments of a method of protecting at least one object, the at least one launching mechanism comprises at least one base which is rotatable, tiltable, or combination thereof, configured to direct the launching of the at least one UAV in a desirable direction.

In some embodiments of the method of protecting at least one object, the method comprises prior to launching, directing the at least one launching mechanism toward the at least one incoming aerial or ground threat after receiving the at least one alert signal from the at least one TAS, wherein the at least one base is configured to be activated for directing the at least one launching mechanism after receiving the at least one alert signal from the at least one TAS.

In some embodiments, in a method of protecting at least one object, the at least one UAV comprises at least one additional encountering mechanisms comprising at least one explosive element, at least one shock wave generator, at least one laser beam weapon, at least one firearm, at least one net, at least one radar jamming device, at least one optical deception device, or a combination thereof.

In some embodiments, in a method of protecting at least one object, the at least one UAV comprises at least one encountering mechanism comprising at least one explosive element, at least one shock wave generator, at least one laser beam weapon, at least one firearm, at least one net, at least one radar jamming device, at least one optical deception device, or combination thereof; at least one triggering element; and wherein the encountering of the at least one UAV with the at least one incoming threat is in the proximity of the at least one incoming threat, and after the encounter the at least one triggering element initiates the action of one or more of the at least one encountering mechanisms.

In some embodiments, in a method of protecting at least one object, the at least one triggering element is one or more of a fuse, a signal activator, an air bag mechanism, wherein the at least one fuse is optionally a proximity fuse, a contact fuse, or a combination thereof. The method of protecting at least one object, wherein the at least one UAV comprises at least one proximity sensor for activating the at least one triggering element, wherein the at least one proximity sensor may be one or more of an optical sensor, a heat sensor, an electromagnetic sensor, a RF sensor, and a combination thereof.

In some embodiments, in a method of protecting at least one object, the encountering of the at least one UAV with the at least one incoming threat, e.g., aerial threat, is by collision.

In some embodiments, the at least one UAV is mounted on at least one object, or at the vicinity of the at least one object.

In some embodiments, in a method of protecting at least one object, the at least one TAS is mounted on the at least one object, or at the vicinity of the at least one object.

In some embodiments, in a method of protecting at least one object, the object is one or more moving object or stationary object.

In some embodiments, in a method of protecting at least one object, the method comprises after receiving the at least one alert signal, activating the at least one navigation system and the at least one sensor navigation unit.

According to another aspect of the invention provided is an incoming threat protection system for protecting at least one object from at least one incoming aerial or ground threat, the system comprising at least one threat alerting system (TAS), e.g., ATAS, configured for generating and sending at least one alert signal of at least one incoming aerial or ground threat; at least one UAV comprising at least one flight control system and at least one sensor navigation unit; and wherein the at least one UAV is configured to be launched after the at least one alert signal is received by the at least one UAV; wherein thereafter the at least one flight control system and at least one sensor navigation unit are configured to navigate the at least one UAV toward the at least one incoming aerial or ground threat, to thereby encounter the at least one UAV with the at least one incoming aerial or ground threat.

In some embodiments, in a system for protecting at least one object, the at least one alert signal from the at least one TAS comprises at least one position vector data of the at least one incoming aerial or ground threat, or at least partial position vector data of the at least one incoming threat.

In some embodiments, in a system for protecting at least one object, the at least one sensor navigation unit may be any one of an optical sensor, a radar, a LIDAR, and a combination thereof.

The system for protecting at least one object comprises at least one UAV which is loaded into, or onto, at least one launching mechanism.

In some embodiments, in a system for protecting at least one object, the at least one UAV is configured to be deformed prior to, or while loaded into or onto the at least one launching mechanism.

In some embodiments, in a system for protecting at least one object, the at least one launching mechanism comprises a base which is rotatable, tiltable, or combination thereof, configured to direct the launching of the at least one UAV in a desirable direction.

In some embodiments, in a system for protecting at least one object, the launching mechanism is configured to be directed toward the at least one incoming aerial or ground threat after receiving the at least one alert signal from the at least one TAS, wherein the at least one base is configured to be activated for directing the at least one launching mechanism after receiving the at least one alert signal from the at least one TAS.

In some embodiments, in a system for protecting at least one object, the at least one UAV comprises at least one additional encountering mechanisms comprising at least one explosive element, at least one shock wave generator, at least one laser beam weapon, at least one firearm, at least one net, at least one radar jamming device, at least one optical deception device, or a combination thereof.

In some embodiments, in a system for protecting at least one object, the at least one UAV comprises at least one encountering mechanisms comprising at least one explosive element, at least one shock wave generator, at least one laser beam weapon, at least one firearm, at least one net, at least one radar jamming device, at least one deception device, or combination thereof; at least one triggering element; and wherein the encountering of the at least one UAV with the at least one incoming threat is in the proximity of the at least one incoming threat.

In some embodiments, in a system for protecting at least one object, the at least one triggering element is one or more of a fuse, a signal activator, an air bag mechanism, wherein the at least one fuse is optionally a proximity fuse, a contact fuse, or a combination thereof.

In some embodiments, in a system for protecting at least one object, the at least one UAV comprises at least one proximity sensor for activating the at least one triggering element, wherein the at least one proximity sensor may be any one, or more, of an optical sensor, a heat sensor, an electromagnetic sensor, a RF sensor, and combination thereof.

In some embodiments, in a system for protecting at least one object, the encountering of the at least one UAV with the at least one incoming threat, e.g., aerial threat, is by collision.

In some embodiments, in a system for protecting at least one object, the at least one UAV is mounted on an object to be protected, or at the vicinity of the object.

In some embodiments, in a system for protecting at least one object, the at least one TAS is mounted on the at least one object, or at the vicinity of the at least one object.

In some embodiments, in a system for protecting at least one object, the at least one object is any one or more of a moving object or a stationary object.

In some embodiments, in a system for protecting at least one object, the at least one flight control system and the at least one sensor navigation unit are configured to be actuated by at least one alert signal from the at least one TAS.

According to another aspect of the invention, there is provided a UAV for protecting at least one object from at least one incoming aerial or ground threat, wherein the UAV comprising a propulsion system; at least one flight control system; at least one sensor navigation unit; wherein the at least one UAV is configured to be launched after receiving an at least one alert signal from at least one threat alerting system (TAS), such as ATAS; wherein the at least one flight control system and at least one sensor navigation unit are configured to navigate the UAV toward the at least one incoming threat, and thereafter encountering the UAV with the at least one incoming aerial or ground threat.

In some embodiments, in a UAV for protecting at least one object, the at least one alert signal from the at least one TAS comprises at least one position vector data of the at least one incoming aerial or ground threat, or at least one partial position vector data of the at least one incoming threat.

In some embodiments, in a UAV for protecting at least one object, the at least one sensor navigation unit may be one of an optical sensor, a radar, a LIDAR, or a combination thereof.

In some embodiments, in a UAV for protecting at least one object, the UAV further comprising, prior to launching, loading UAV into, or onto, at least one launching mechanism, respectively.

In some embodiments, in a UAV for protecting at least one object, the UAV is deformed before, or while loaded into or onto the at least one launching mechanism.

In some embodiments, in a UAV for protecting at least one object, the at least one launching mechanism comprises a base which is rotatable, tiltable, or combination thereof, configured to direct the launching of the at least one UAV in at least one desirable direction.

In some embodiments, in a UAV for protecting at least one object, the at least one launching mechanism is configured to be directed toward the at least one incoming threat after receiving the at least one alert signal from the at least one TAS, wherein the at least one base is configured to be activated for directing the at least one launching mechanism after receiving the at least one alert signal from the at least one TAS.

In some embodiments, in a UAV for protecting at least one object, the UAV comprises further at least one additional encountering mechanisms comprising, at least one explosive element, at least one shock wave generator, at least one laser beam weapon, at least one firearm, at least one net, at least one radar jamming device, at least one optical deception device, or a combination thereof.

In some embodiments, in a UAV for protecting at least one object, the UAV comprises further at least one further encountering mechanisms comprising, at least one explosive element, at least one shock wave generator, at least one laser beam weapon, at least one firearm, at least one net, at least one radar jamming device, at least one optical deception device, or combination thereof; at least one triggering element; and wherein the encountering of the UAV with the at least one incoming threat is in the proximity of the at least one incoming threat.

In some embodiments, in a UAV for protecting at least one object, the at least one triggering element is one or more of a fuse, a signal activator, an air bag mechanism, wherein the at least one fuse is optionally a proximity fuse, a contact fuse, or a combination thereof.

In some embodiments, in a UAV for protecting at least one object, the UAV comprises at least one proximity sensor for activating the at least one triggering element, wherein the at least one proximity sensor may be one or more of an optical sensor, a heat sensor, an electromagnetic sensor, a RF sensor, and a combination thereof.

In some embodiments, in a UAV for protecting at least one object, the encountering of the UAV with the at least one incoming threat, e.g., aerial threat, is by collision.

In some embodiments, in a UAV for protecting at least one object, the UAV is mounted on the at least one object, or at the vicinity of the at least one object.

In some embodiments, in a UAV for protecting at least one object, the at least one ATAS is mounted on the at least one object, or at the vicinity of the at least one object.

In some embodiments, in a UAV for protecting at least one object, the at least one object is one or more of a moving object or a stationary object.

In some embodiments, in a UAV for protecting at least one object, the at least one flight control system and the at least one sensor navigation unit are configured to be actuated by at least one alert signal from the at least one TAS.

BRIEF DESCRIPTION OF THE DRAWINGS

The invention may be more clearly understood upon reading of the following detailed description of non-limiting exemplary embodiments thereof, with reference to the following drawings, in which.

The following detailed description of embodiments of the invention refers to the accompanying drawings referred to above. Dimensions of components and features shown in the figures are chosen for convenience or clarity of presentation and are not necessarily shown to scale. Wherever possible, the same reference numbers will be used throughout the drawings and the following description to refer to the same and like parts.

DETAILED DESCRIPTION OF EMBODIMENTS

Illustrative embodiments of the invention are described below. In the interest of clarity, not all features/components of an actual implementation are necessarily described.

Figure 1:
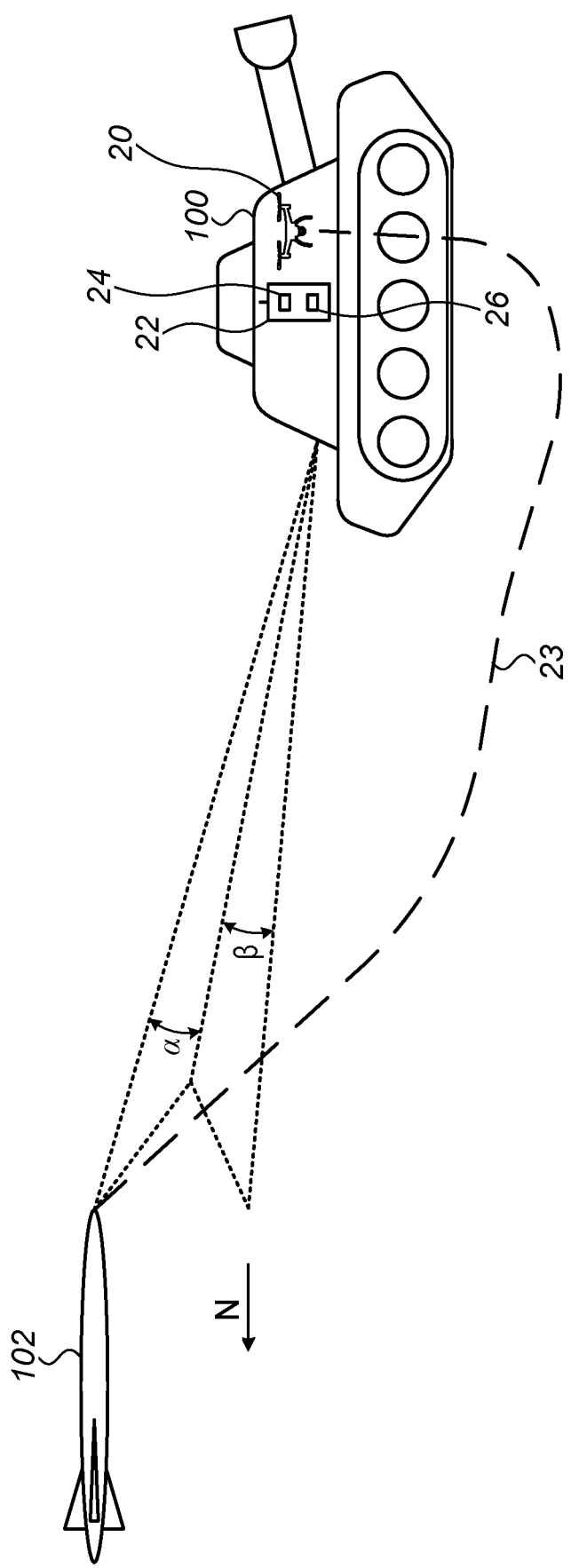
FIG. 1 is a schematic view of an incoming aerial threat protection system in accordance with embodiments of the present invention.

FIG. 1 shows an incoming aerial threat protection system in accordance with the present invention for protecting an object 100, illustrated by a tank. It should be understood that incoming aerial threat protection system can be used to protect a variety of objects, which may be objects in motion or stationary objects, comprising but not limited to one or more of tanks; troop carriers; people; buildings; army bases or posts, trucks and automobiles as well as to protect aerial vehicles (e.g. helicopters, airplanes), marine vehicles (e.g. ships, boats), or off-shore drilling rigs.

It should also be understood that despite the mere association depicted in FIG. 1 between an object to be protected and a UAV, the UAV may be positioned independent of any one object and operated to neutralize an incoming threat not necessarily directed at a particular object. Also, while the figures demonstrating certain embodiments of the invention contemplate protection from incoming aerial threats, similar configurations may be contemplated for protection from incoming ground threats. Where an ATAS unit is relevant for detection of aerial threats, a TAS unit may be relevant for detection of ground threats. Thus, embodiments of the invention provided below with respect to the figures, may be similarly stated to include TAS rather than ATAS units. Reference to ATAS below is therefore not limiting.

The incoming aerial threat protection system comprises a UAV 20 (which may also be referred to interchangeably as a "drone", herein the specification and claims). The protection system also comprises an aerial threat alerting system (ATAS) 22 with threat identification sensors 24 configured to identify an incoming aerial threat 102 (illustrated by a missile comprising a warhead), for example including plume sensors to detect the radiant energy of a missile plume, typically in the ultra-violet and infra-red portions of the electromagnetic spectrum. Optionally, ATAS 22 may provide an alert of firing point of an aerial threat 102. After launching UAV 20 flies in a flight path 23 toward incoming aerial threat 102.

As noted herein, the threat alerting systems (TAS) may detect approaching missiles, or other approaching aerial or ground threats, and may also enact defensive counter-measures. Different TAS types may provide multiple alerts to multiple threats, and various ranges. One non-limiting example of an ATAS is "Trophy" (Meil Ruach), manufactured by RAFAEL, Israel. Generally, the detection is performed by electro-optical missile warning sensors, or via other technologies or a combination thereof. These sensors detect the radiant energy of the missile plume, typically in the ultra-violet and infra-red portions of the electromagnetic spectrum. Threat alerting systems for incoming ground threats are similarly known, as disclosed herein.

ATAS 22 comprises an activation alert signal generating and output unit 26 (referred to hereafter as "unit 26", or "output unit 26") configured to send an alert signal to UAV 20 in order to activate and launch the UAV (actuate the UAV to operate its propulsion system 36 (FIG. 2) and actuate the UAV's other systems/units, for navigation, proximity detection, etc.). Accordingly, upon the ATAS 22 detecting incoming aerial threat 102 via the ATAS threat identification sensors 24. Output unit 26 may be configured to generate and send UAV 20 a data alert signal comprising general direction of aerial threat 102, e.g. altitude and azimuth location data of threat 102 indicating exemplary angles α and β, indicating the position vector data of aerial threat 102 in relation to object 100 as detected initially by sensors 24. Alternatively, output unit 26 may send a data alert signal to UAV 20 comprising an alert of an incoming aerial threat 102 while the alert signal comprises only partial information of the position vector of aerial threat 102 (e.g. not indicating the distance of aerial threat 102, and/or one, or two exemplary angles α and β). Alternatively, output unit 26 may send a data alert signal to UAV 20 comprising only an alert of an incoming aerial threat 102 with no further data regarding aerial threat 102.

Aerial threat 102 is illustrated, and referred to at times as a missile, however, one skilled in the art may easily comprehend that this embodiment is non-limiting. An aerial threat may be a drone of any type, or another threatening object. The threatening need not be in constant motion or in motion at all. Furthermore, an aerial threat relates to any object threatening, or may be threatening, in any way of an object or a site, either by approaching to a particular location of interest (e.g. object of military importance such as a tank or helicopter, a strategic site). Approaching may be by air, but is not limited for travelling by air, thus approaching may be alternatively, or additionally, through other medium such as water, on the ground, or a combination thereof. Alternatively, an aerial threat may be a surveillance item operating in oppose to an interest (e.g. invading privacy by tracking and/or collecting and/transferring data). An aerial threat may be an object identified by ATAS as an immediate threat (within a given short time), or threat which may operable at a later interval of time after detected by ATAS.

Figure 2:
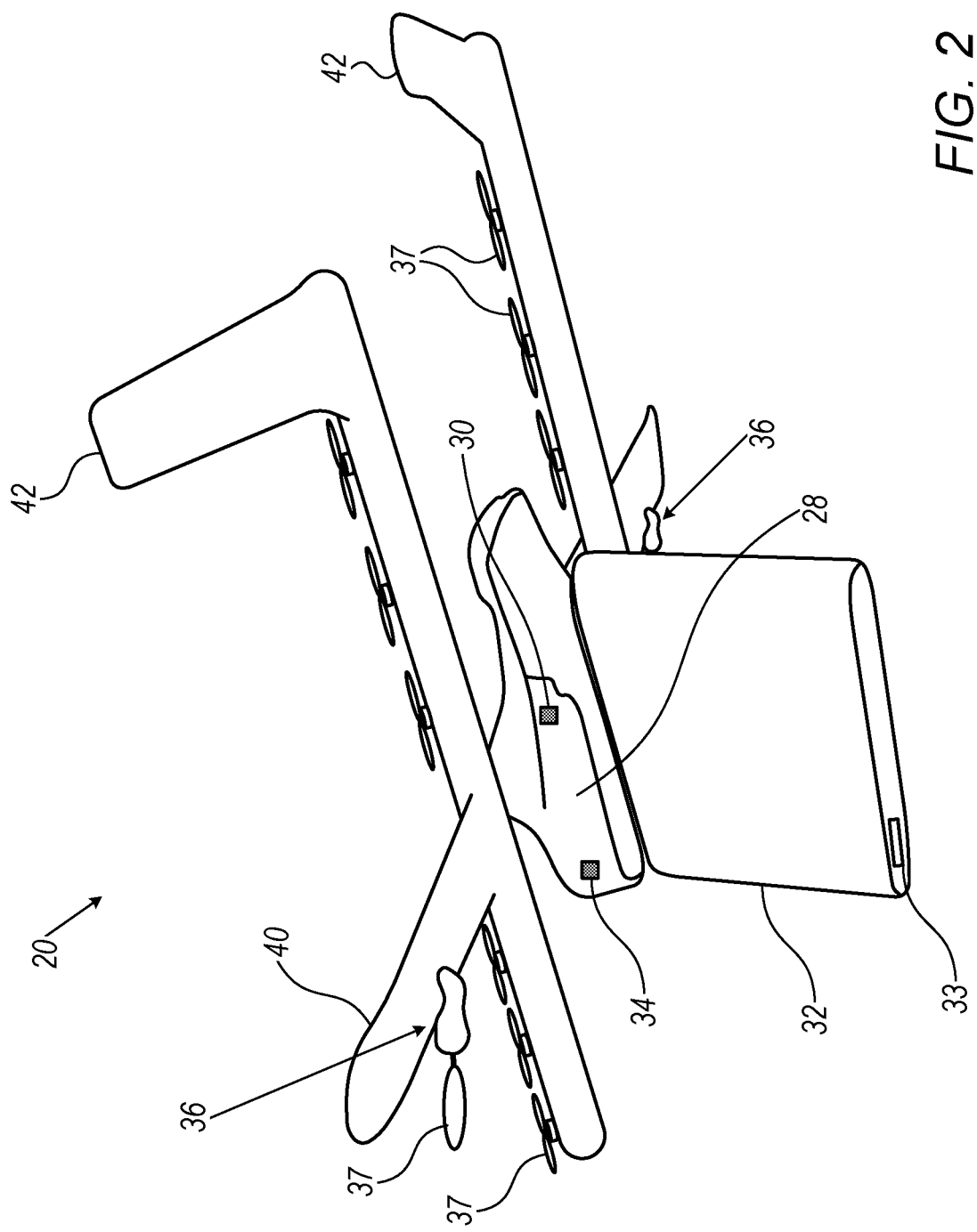
FIG. 2 is a perspective view of an exemplary Unmanned Aerial Vehicle (UAV) in accordance with embodiments of the present invention.

FIG. 2 shows a more detailed schematic view of an exemplary UAV of the protection system, such as UAV 20, which comprises a flight control system 28 (located within UAV 20), and a sensor navigation unit 30. An exemplary non-limiting flight control system 28 may be "Vector" manufactured by UAV Navigation, Spain. However any flight control systems of other types or sizes may be used as well. According to some embodiments, flight control systems comprise a self-adjusting and adaptation capabilities (e.g. artificial intelligence), which enable the UAV to fly; maneuver and hover in order to reach and encounter aerial threat 102. A sensor navigation unit 30 may be an optical sensor (e.g. electro-optical), radar, a LIDAR, a combination thereof, or any other useful sensor. LIDAR referring generally to a device using a method for measuring distances (ranging) by illuminating the target with laser light and measuring the reflection with a sensor, According to some embodiments the sensor navigation unit 30 may be part of a flight control system 28.

The protection system may be implemented wherein UAV 20 is designed/intended to encounter with aerial threat 102. UAV 20 encountering aerial threat 102 may be enabled after its launching by flight control system 28, and a sensor navigation unit 30 which directs UAV 20. Thus, sensor navigation unit 30 providing position vector of aerial threat 102 to flight control system 28. UAV 20 may receive initial direction of aerial threat 102 from output unit 26, and thereafter self-navigate to encounter aerial threat 102. Alternatively, no initial direction of aerial threat 102 is received from output unit 26, and at launching, or immediately thereafter, UAV 20 self-navigates using flight control system 28, and a sensor navigation unit 30 to encounter aerial threat 102.

Encountering of UAV 20 and aerial threat 102 refers to actual collision, i.e. physical contact between any section of aerial threat 102, and any section of UAV 20 and/or an encountering mechanism of UAV 20. Furthermore, encountering refers also to the presence of UAV 20, and/or an encountering mechanism of UAV 20 within a vicinity of aerial threat 102 in order to effect the ability of aerial threat 102 of reaching object 100, and/or, reduce lethal effectiveness of aerial threat 102 concerning object 100.

Accordingly, encountering of UAV 20 with aerial threat 102 may by collision, or proximity collision, which may activate (e.g. detonate) the warhead of aerial threat 102, before reaching its destination (e.g. platform 100 in FIG. 1). Alternatively, encountering UAV 20 with aerial threat 102 may divert aerial threat 102 from reaching its destination (e.g. platform 100 in FIG. 1), and/or diminish predefined lethal effectiveness of aerial threat 102 upon reaching its destination.

Encountering of UAV 20 with aerial threat 102, which may comprise a physical contact (e.g. collision), or UAV 20 hovering in proximity of aerial threat 102, may be reached by encountering mechanism of UAV 20. Thus, according to some embodiments an encountering mechanism may generate shock waves which may reduce or eliminate the threat from platform 100 in FIG. 1. Thus, shock waves generated by UAV 20 may activate the warhead of aerial threat 102, and/or divert aerial threat 102 from reaching its destination. According to some embodiments shock waves may be generated by a payload of UAV 20. Thus, UAV 20 may be designed/intended to explode aerial threat 102, via an explosive payload or explosive device 32, which may comprise a triggering element such as fuse 33. Triggering elements may be any type of fuse (e.g. proximity fuse; contact fuse, combination thereof), signal explosion activator, an air bag mechanism triggering explosion and/or movement of a mechanical knob, and others. The triggering element triggering explosion of explosive payload or explosive device 32 may be due collision of UAV 20 with aerial threat 102. Additionally, or alternatively triggering explosion of explosive payload or explosive device 32 may be due to a proximity sensor activating a triggering element. Thus, UAV 20 comprise a threat proximity sensor 34, which may be an optical sensor, a heat sensor, an electromagnetic sensor, a RF sensor, any combination thereof, or any other sensor enabling to determine if/when the UAV is in suitable proximity to aerial threat 102 in order to eliminate, or reduce the threat from object 100. Accordingly, once determined by proximity sensor 34 that UAV 20 is within the encountering vicinity of aerial threat 102, sensor 34 generates an alert signal to triggering element (e.g. fuse 33) which detonates the explosive payload or explosive device 32. The encountering vicinity may be predefined according to the explosive effectiveness of the explosive payload or explosive device 32 (e.g. a distance less than 10 meters, less than 25 meters, less than 50 meters, or less than 100 meters from aerial threat 102).

Other embodiments of the invention may provide that sensor navigation unit 30 of UAV 20 may also serve as a proximity sensor of UAV 20, alternatively, or additionally, to proximity sensor 34.

In further embodiments UAV 20 may comprise, additionally, or alternatively, to an explosive payload or explosive device 32, other encountering mechanisms. Placing the other encountering mechanisms is not limited to the positioned of explosive payload or explosive device 32, and be within UAV 20, or adjacent to any part of UAV 20 (e.g. front, rear, either sides). Other encountering mechanisms may be any mechanism that at encountering with an aerial threat (e.g. aerial threat 102) may eliminate, or at least may reduce, the threat of an object (e.g. object 100). Examples of encountering mechanisms can comprise a laser beam weapon, and/or a firearm, or a plurality thereof. Thus, said optional action of laser beam weapon, or firearm may be initiated by a triggering element activated by proximity sensor 34, and/or by sensor navigation unit 30 (i.e. used as a proximity sensor identifying proximity of aerial threat 102, and thereafter, activating a triggering element). Upon Said encountering mechanism, and thereafter, may encounter aerial threat 102 and activated its warhead, divert aerial threat 102 from reaching object 100, or reduce possible damage from aerial threat 102 to object 100.

According to some embodiments proximity sensor 34, and/or sensor navigation unit 30 may comprise a predefined proximity distance of aerial threat 102, wherein once determined that UAV 20 is within said predefined distance, or less, will activate a triggering element that will initiate explosion of explosive payload or explosive device 32. The predefined proximity distance can be defined according to the explosive payload or explosive device, and its capability to eliminate, or at least, diminish, the threat of aerial threat 102. Similarly, a UAV 20 comprising other encountering mechanisms will have a proximity distance predefined in accordance to the capabilities of said encountering mechanisms e.g. less than 25 meters, less than 50 meters, less than 200 meters, or even greater).

Additionally, or alternatively, UAV 20 may comprise a further encountering mechanism which is a net. A net may comprise a plurality of weights. The weights may be embedded in the net, optionally at, or adjacent to, the edges of the net, and/or throughout the net. The weights may be of small weight 0.01-1.0 kilogram, or heavier. Additionally, or alternatively, the net may comprise heavier portions which are at the most at the edges, or close to the edges of the net. Accordingly, UAV 20 comprising a proximity sensor 34 may activate release of the net from its position held as payload of UAV 20. A release of a net according to some embodiments may be by proximity sensor 34 activating a triggering element which releases a net from its location. A net's location before its release may be adjacent to, and/or within any part of UAV 20. Thus, a triggering element may simply allow release of the net from its held position, and/or stimulate release of a net in a particular direction (e.g. by a spring). The location of the net before its release (optionally, in the front, beneath, or over UAV 20) is in a way that once released the net spreads in a wide area, that net may be at one stage after its release perpendicular to the flight direction of UAV 20.

The net release provides a large spreading of the net, which may, or may not, be attached to UAV 20 after its release, thus increasing significantly the capability of collision, and/or proximity collision encountering with aerial threat 102. Thus, a net encountering can detonate the warhead of aerial threat 102 (e.g. by touching, hitting, or colliding the warhead, or within its proximity). The spreading of the net may be reached due to the initial kinetic energy of the net at its release (i.e. due to its motion attached to UAV 20), and the mass of the weights attached to the net, or alternatively the weight of the net. Concentrating a mass at edges (e.g. embedded weights, comprising heavier portions), or close to the edges, provides an initial wide spreading of a net, and may also provide after collision of the net, or part thereof, with aerial threat 102 a wrapping movement of the net, or part thereof, around at least part of aerial threat 102.

According to some embodiments a UAV 20 may comprise more than one net, other embodiments may comprise that the release of the net and thereafter its spreading out may leave part of the net attached to UAV 20. The part attached to UAV 20 may be a part, or parts, of the net itself. Additionally, or alternatively, the net may remain attached to UAV 20 using a cord, or cords, thus, optionally enabling the net to spread open (e.g. partially open, fully open) at a distance from UAV 20 (e.g. avoid/minimize touching of the net with a rotor, or other parts of UAV 20). The area of a net may be of different sizes, ranging from 0.5 m$^2$ through 100 m$^2$. According to some embodiments immediately after the net is released UAV 20 hovers, or stops its propulsion means (e.g. stops the engine of UAV 20) and does not continue its flight. According to some embodiments proximity sensor 34, and/or sensor navigation unit 30 may activate a net release at a distance of less than 5 meters, less than 10 meters, less than 20 meters, less than 50 meters, or less than 100 meters from aerial threat 102.

A further encountering mechanism may comprise a radar jamming device and/or a deception device activated to encounter aerial threat 102 thus reducing its capability to attack object 100. The radar jamming device and/or deception device may be based on electronic jamming (e.g. using an electronic jamming device), and/or, optical deception (e.g. using an optical deception device), or other means. The radar jamming device and/or optical deception device may be activated (e.g. towards aerial threat 102, firing location of aerial threats) immediately after launching of UAV 20, or after triggered by a triggering element activated by proximity sensor 34. Thus, proximity sensor 34 may initiate electronic jamming and/or optical deception directly by generating a signal received by an electronic jamming device, and/or an optical deception device, respectively. Alternatively, electronic jamming and/or optical deception may be initiated after proximity sensor 34 activates a triggering element which initiates said electronic jamming and/or optical deception, According to some embodiments proximity sensor 34, and/or sensor navigation unit 30 may activate jamming device and/or optical deception device at a distance of less than 15 meters, less than 30 meters, less than 50 meters, less than 150 meters, less than 500 meters, less than 1.0 kilometer, less than 2.0 kilometer, or further from aerial threat 102.

According to some embodiments sensor navigation unit 30 may comprise radar, e.g. a long-range radar (LRR) system. According to some embodiments, the LRR may use the 77 GHz band (in the range of 76-81 GHz), or 33 GHz band, to provide better accuracy and better resolution in a smaller package. Further embodiments may use any range 1-100 GHz. LRR can also be used for measuring the distance to and speed of aerial threat 102 in a wide field of view e.g. for cross traffic alert systems. One non-limiting exemplary radar may be from the type of "Q240R Series" manufactured by Banner Engineering Corp. U.S.A. or the like, which may be adjusted to longer ranges. Accordingly, long range applications require directive antennas that provide a higher resolution within a more limited scanning range. LRR systems provide identification ranges starting a few meters from LRR's location, and reaching 1,000 m, and alternatively extend to ranges up to 2,000, 3,000 m, 5-20 Km, or even greater.

UAV 20 comprises a propulsion system 36 (such as a battery or a battery system, or an engine, or another suitable propulsion means). If an engine, it may be of the jet engine type or be used to power one or more rotors 37 to provide lift and forward motion as required.

UAV 20 typically also comprises wings 40, which may be deformable, thus, configured to fold by any mechanism known per se, whereby it can be more convenient for the UAV to fit into a launching tube, if any, or simply for more convenient transport and storage. Alternatively, a UAV used according to present invention may be with a single wing, or no wing at all (e.g. rotor UAV), thus, provided with other hovering means, or combination thereof. UAV 20 may also comprise a stabilizer 42 with one or more tail rudders.

Though FIG. 2 depicts one type of UAV, one skilled in the art can clearly appreciate that UAV 20 may be any other type of UAV. For example multi-rotor UAV, single wing UAV, single-rotor helicopter, quadcopters, VTOL (Vertical Take-Off and Landing) UAV, and others, each is within the scope of demonstrating the invention, and may comprise all elements depicted in view of UAV 20. Furthermore, UAV 20, as well as other UAVs that may be used according to the present invention, may place one or more of the depicted elements in other parts of the UAV, and/or in a different settings. In other embodiments UAVs of the present invention may comprise further elements, or alternatively less of the elements depicted in view of UAV 20. In other embodiments, deformable UAVs may have other foldable, and/or bendable, parts configured to fold and/or band by any mechanism (hereafter referred as deformable UAVs), or due to their structure (e.g. fabrication materials, assembly of parts), enabling the UAV to fit into a launching tube or mechanism, if any, or simply for more convenient transport and storage. Providing exemplary non-limiting deformable UAVs may be UAVs comprising folding rotors, or folding quadcopter.

Figure 3:
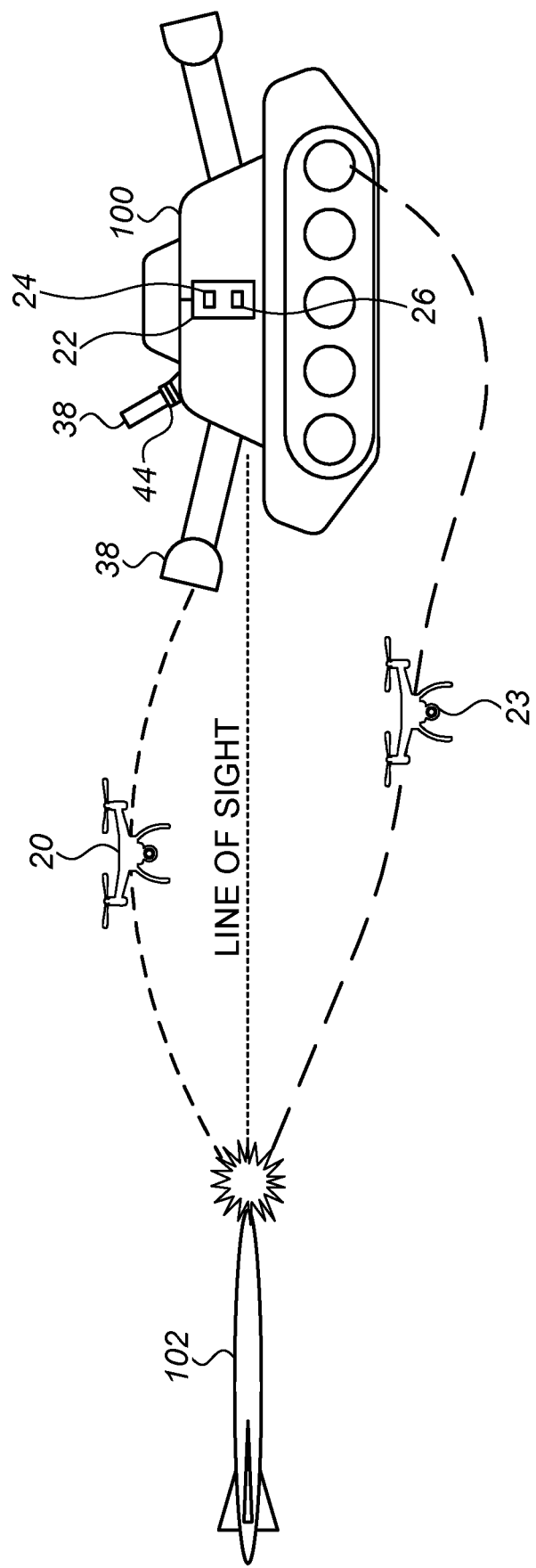
FIG. 3 is a schematic view of the incoming aerial threat protection system in accordance with further embodiments of the present invention.

FIG. 1 and FIG. 3 depict aerial threat 102 as a missile comprising a warhead. However, the example should be regarded as a non-limiting example. Accordingly, embodiments of the method and system of the present invention are configured to address all aerial threats. Thus, further exemplary aerial threats may be a UAV, a projectile, an aircraft from any type. Furthermore, the shape and size of aerial threat is not limited as well.

FIG. 3 shows additional embodiments of the invention wherein the protection system further comprises two UAVs, 20; 21, and a launching mechanism 38 (illustrated by a launching tube), which launches UAV 20. ATAS 22, and output unit 26 may actuate launching of UAV 20 and 21. The actuation of UAV 20 and UAV 21 may be simultaneously or sequentially. Launching mechanism 38 can also be activated by output unit 26 to actuate launching UAV 20. Alternatively, output unit 26 can simultaneously or sequentially activate launching mechanism 38 and UAV 20. Launching mechanism 38 can be configured to maneuver (e.g. similar to a base for directing a canon of a tank) via a rotatable and/or tiltable base 44 so as to direct the launching of UAV 20 in the general direction of threat 102. Directing launching mechanism 38 in desirable direction (i.e. in the direction of aerial threat 102) may be manually. Alternatively, base 44 may rotate and/or tilt after activated by output unit 26. Thus, after base 44 receives an alert signal from output unit 26 (e.g. comprising position vector data of aerial threat 102, or partial positing vector data thereof), base 44 rotates and/or tilts launching mechanism 38, thus, directing launching mechanism 38 towards the approaching, or threatening, aerial threat 102. Additionally, or alternatively, base 44 may be rotated and/or tilted mechanically not in a direct response to an alert signal from output unit 26. Launching mechanism 38 may be a pyrotechnic launching mechanism. Alternatively, launching mechanism 38 may be a compressed gas launching mechanism. Optionally, launching mechanism 38 may be a mechanical launching mechanism, for example including a spring.

In some implementations, UAV 20 may be hovering prior to receiving any alert signal from ATAS 22. According to said implementations, launching of UAV 20 towards an aerial threat 102 will take place after receiving the alert signal from ATAS 22.

According to further embodiments of the present invention, the aerial threat protection system may comprise, additionally to ATAS 22, one drone 20, two drones, or more drones, wherein one or more of the drones may be mounted on an object to be protected (e.g. object 100), or in its vicinity. The vicinity of an object to be protected may be for example at a distance less than 10 meters, less than 50 meters, less than 100 meters, less than 500 meters, less than 1.0 kilometer, less than 5.0 kilometer, from object to be protected. Further embodiments may provide that within one aerial protection system there are different types of drones which may use alternative launching mechanisms, and/or no launching mechanism. One exemplary launching mechanism relates to a mechanism comprising a generally tube wherein a folded quadcopter may be inserted before launching, and after receiving an alert signal from ATAS, the quadcopter is actuated and launched from the launching mechanism in other embodiments the quadcopter may be first launched and after actuated. After departing the launching mechanism the quadcopter unfolds and flies towards an aerial threat for encountering with the aerial threat.

Other embodiments of the present invention may comprise a UAV, or UAVs, protecting a single object, or more than one object, wherein the aerial threat protection system not comprising one, or more launching mechanisms, or no launching mechanism at all.

Embodiments of the invention comprising more than one drone, a single ATAS 22, or a plurality of ATAS 22, may be used for activating said drones (one, or more drones). Accordingly, a system comprising more than one drone may provide that the drones may be activated simultaneously or sequentially by said ATAS or ATASs to approach threat 102. ATAS may be mounted on object 100, or at a location remote from object 100. Alternatively, ATAS 22 may be located in the vicinity of object 100, which for example may be at a distance less than 10 meters, less than 50 meters, less than 100 meters, less than 500 meters, less than 1.0 Km, less than 5.0 Km, from object 100.

Furthermore, in embodiments according to the present invention comprising more than one drone, the protection system may comprise further a drone firing control unit. A drone firing control unit may receive an alert signal from output unit 26 of ATAS 22 (and/or a plurality of ATAS 22). The drone firing control unit may activate one or more drones towards one approaching threat 102, and not activate one, or more other drones of the protection system. Alternatively, the drone firing control unit can elect one, or more drones to be activated against an approaching threat, and activate one, or more other drones against one, or more further elected threats Other embodiments of the present invention may provide UAV 10 to receive more than one alert signal regarding one, or more aerial threats approaching an object to be protected.

According to other embodiments an aerial threat protection system may comprise further, or alternatively, a drone which comprises also an ATAS. Accordingly, in the present embodiment ATAS comprised in drone 20 may comprise identification sensors, and an output unit similar to that of ATAS 22 (i.e. like sensors 24, and output unit 26). Consequently, drone 20 is not dependent on presence of ATAS in the vicinity of, and/or, mounted on, an object to be protected. ATAS 22 mounted on drone 20 may generate an alert signal, which may activate the drone it is on to fly toward approaching threat 102. Further embodiments provide a ATAS 22 mounted on a drone, wherein the output unit 26 may activate a rotatable and/or tiltable base 44, and/or a launching mechanism 38 (depicted in view of FIG. 3), and the drone itself.

Other embodiments of the invention may provide that drone 20 of the aerial threat protection system be activated and fly towards approaching aerial threat 102 (e.g. a missile) and may hover at any time there between.

A protection system and method of the present invention may operate individually or additionally to a further protection system, or systems, of an object, or objects, from incoming aerial threats.

It should be understood that the above description is merely exemplary and that there are various embodiments of the present invention that may be devised, mutatis mutandis, and that the features described in the above-described embodiments, and those not described herein, may be used separately or in any suitable combination; and the invention can be devised in accordance with embodiments not necessarily described above.

The invention claimed is:

1. A method of encountering at least one incoming aerial threat, the method comprising:
   detecting the at least one incoming aerial threat by at least one threat alerting system (TAS);
   receiving, by at least one non-active UAV or a UAV at a resting ground position, at least one alert signal generated by the at least one threat alerting system (TAS) in response to the detecting of the at least one incoming aerial threat;
   the at least one alert signal consisting of an alert of existence of the at least one incoming aerial threat with no further data regarding the at least one incoming aerial threat;
   in response to receiving by said at least one non-active UAV or the UAV at a resting ground position the at least one alert signal, the at least one non-active UAV is self-launched at an initial direction of the incoming threat and thereafter fully autonomously self-navigates to encounter the at least one threat, wherein the UAV comprises at least one sensor navigation unit and a flight control system to self-navigate to encounter the at least one incoming aerial threat without any communication with a ground control once the UAV is launched;
   wherein the at least one sensor navigation unit directs the flight control system of the at least one UAV toward the at least one incoming aerial threat, and
   encountering the at least one incoming aerial threat by the at least one UAV.

2. The method according to claim 1, further comprising:
   sending the at least one alert signal to the UAV providing an indication of the at least one incoming aerial threat.

3. The method of claim 1, wherein the at least one sensor navigation unit is selected from an optical sensor, a radar, a LIDAR, and a combination thereof.

4. The method of claim 1, comprising, prior to launching the UAV, loading the at least one UAV into or onto at least one launching mechanism.

5. The method of claim 1, comprising, prior to launching, directing at least one launching unit holding or comprising the UAV toward the at least one incoming threat after receiving the at least one alert signal from the at least one TAS.

6. The method of claim 1, wherein the at least one UAV further comprises at least one encountering mechanism, the encountering mechanism comprising one or more of at least one explosive element, at least one shock wave generator, at least one laser beam weapon, at least one firearm, at least one net, at least one radar jamming device, and at least one optical deception device.

7. The method of claim 6, wherein the at least one UAV encountering mechanism further comprises at least one triggering element.

8. The method of claim 7, wherein the at least one triggering element is selected from at least one fuse, at least one signal activator and at least one air bag mechanism, wherein the at least one alert signal consists of the alert of the position vector of the incoming threat with no further data regarding the threat.

9. The method of claim 1, wherein the encountering of the at least one UAV with the at least one incoming threat is by collision.

10. The method of claim 1, wherein the method comprises, after receiving the at least one alert signal, activating the at least one flight control system and the at least one sensor navigation unit, wherein the at least one UAV further comprises a long range radar system providing identification ranges from 1000 meters to 20 Km.

11. An incoming threat encountering system for encountering at least one incoming aerial threat, the system comprising:
    at least one aerial threat alerting system (TAS);
    at least one UAV comprising a flight control system, an encountering mechanism, and at least one sensor navigation unit, and
    at least one launcher for launching one or more UAV;
    wherein
    the TAS is configured for detecting at least one incoming aerial threat, generating and sending at least one alert signal indicative of the at least one incoming aerial threat to at least one non-active UAV or a UAV at a rest ground position;
    the at least one alert signal consists of an alert of existence of the at least one incoming aerial threat with no further data regarding the at least one incoming aerial threat;
    wherein in response to receiving by said at least one non-active UAV or the UAV at a resting ground position the at least one alert signal, the at least one non-active UAV is self-launched at an initial direction of the incoming threat and thereafter fully autonomously self-navigates to encounter the at least one threat, wherein the UAV comprises the at least one sensor navigation unit and the flight control system enabling self-navigation to encounter the at least one threat without any communication with a ground control once the UAV is launched;
    the flight control system is configured and operable to launch the at least one UAV upon receiving the at least one alert signal from the at least one TAS; and
    the at least one sensor navigation unit is configured for permitting self-navigation of the at least one UAV toward the at least one incoming aerial threat without any communication with the ground control, and encountering the at least one incoming aerial threat with the at least one UAV.

12. The system of claim 11, wherein the at least one sensor navigation unit is selected from an optical sensor, a radar, a LIDAR, and a combination thereof.

13. The system of claim 11, wherein the at least one UAV encountering mechanism comprises one or more of at least one explosive element, at least one shock wave generator, at least one laser beam weapon, at least one firearm, at least one net, at least one radar jamming device, and at least one optical deception device.

14. The system of claim 13, wherein the at least one UAV encountering mechanism further comprises at least one triggering element.

15. The system of claim 14, wherein the at least one triggering element is one or more of fuse, signal activator and an air bag mechanism.

16. A UAV for protecting at least one object from at least one incoming aerial threat, wherein the UAV comprises:
- a propulsion system;
- at least one flight control system;
- at least one sensor navigation unit;
- wherein the UAV is configured to be launched from a non active state or a rest ground position after receiving an alert signal generated by at least one threat alerting system (TAS); wherein in response to receiving by an at least one non-active UAV or the UAV at a resting ground position the at least one alert signal, the at least one non-active UAV is self-launched at an initial direction of the at least one incoming aerial threat and thereafter fully autonomously solely self-navigates to encounter the at least one threat, wherein the UAV comprises the at least one sensor navigation unit and the at least one flight control system to self-navigate to encounter the at least one incoming aerial threat without any communication with a ground control once the UAV is launched;

the at least one alert signal consisting of an alert of existence of the at least one incoming aerial threat with no further data regarding the at least one incoming aerial threat; and wherein the at least one flight control system and at least one sensor navigation unit are configured to self-navigate the UAV toward the at least one incoming aerial threat, and thereafter the UAV encountering the at least one incoming aerial threat.

17. The method according to claim 1, wherein the TAS is an aerial threat alerting system (ATAS).

* * * * *